(12) United States Patent
Fonseca et al.

(10) Patent No.: US 10,131,559 B2
(45) Date of Patent: Nov. 20, 2018

(54) DUAL MEDIA SYSTEM FOR TREATING WASTEWATER CONTAINING SELENIUM

(71) Applicant: General Electric Company, Schenectady, NY (US)

(72) Inventors: Nelson Fonseca, Oakville (CA); Jeffrey Ronald Cumin, Oakville (CA); Joel Alexander Citulski, Oakville (CA)

(73) Assignee: BL Technologies, Inc., Minnetonka, MN (US)

(*) Notice: Subject to any disclaimer, the term of this patent is extended or adjusted under 35 U.S.C. 154(b) by 243 days.

(21) Appl. No.: 14/969,796

(22) Filed: Dec. 15, 2015

(65) Prior Publication Data
US 2016/0264440 A1 Sep. 15, 2016

Related U.S. Application Data

(60) Provisional application No. 62/131,590, filed on Mar. 11, 2015.

(51) Int. Cl.
*C02F 3/00* (2006.01)
*C02F 3/10* (2006.01)
(Continued)

(52) U.S. Cl.
CPC ............... *C02F 3/00* (2013.01); *C02F 3/101* (2013.01); *C02F 3/305* (2013.01); *C02F 3/04* (2013.01); *C02F 3/06* (2013.01); *C02F 3/103* (2013.01); *C02F 3/106* (2013.01); *C02F 2003/001* (2013.01); *C02F 2003/003* (2013.01); *C02F 2101/106* (2013.01); *C02F 2101/163* (2013.01); *Y02W 10/15* (2015.05)

(58) Field of Classification Search
CPC ...... C02F 2101/106; C02F 3/30; C02F 3/085; C02F 3/10; C02F 3/2833; C02F 3/00; C02F 3/101; C02F 3/305
USPC .................................... 210/611, 612
See application file for complete search history.

(56) References Cited

U.S. PATENT DOCUMENTS

| 4,708,792 A | 11/1987 | Takarabe et al. |
| 6,183,644 B1 | 2/2001 | Adams et al. |

(Continued)

FOREIGN PATENT DOCUMENTS

| CA | 2846658 A1 | 7/2014 |
| JP | 11319865 A | * 11/1999 |
| WO | 2007136160 A1 | 11/2007 |

OTHER PUBLICATIONS

Tomonaga, JP 141319865, English machine translation, pp. 1-9. (Year: 1999).*

(Continued)

*Primary Examiner* — Claire A Norris

(57) ABSTRACT

A bioreactor has a biofilm supporting bed with at least two types of media. An upper media is relatively porous, preferably porous enough to admit particles of a lower media. In use, wastewater flows downwards through the bed. Soluble nitrogen is reduced in the upper media and converted into nitrogen gas. Nitrogen gas bubbles rise through the upper media and escape from the bed. Selenium is reduced in the lower media and converted into elemental selenium. The elemental selenium is released periodically by backwashing the bed, which may cause fluidization or other expansion of the lower media into the upper media.

7 Claims, 3 Drawing Sheets

(51) Int. Cl.
*C02F 3/30* (2006.01)
*C02F 3/04* (2006.01)
*C02F 3/06* (2006.01)
*C02F 101/10* (2006.01)
*C02F 101/16* (2006.01)

(56) References Cited

U.S. PATENT DOCUMENTS

| 2007/0114174 | A1* | 5/2007 | Peeters | C02F 3/006 |
| | | | | 210/605 |
| 2008/0050801 | A1 | 2/2008 | Kelly et al. | |
| 2010/0300963 | A1 | 12/2010 | Peeters et al. | |
| 2013/0240452 | A1* | 9/2013 | Smith | C02F 1/001 |
| | | | | 210/683 |

OTHER PUBLICATIONS

European Search Report and Opinion issued in connection with corresponding EP Application No. 16158956.9 dated Jul. 11, 2016.

\* cited by examiner

DUAL MEDIA SYSTEM FOR TREATING WASTEWATER CONTAINING SELENIUM

CROSS-REFERENCE TO RELATED APPLICATIONS

This application is a non-provisional application of U.S. Application Ser. No. 62/131,590, filed Mar. 11, 2015. U.S. Application Ser. No. 62/131,590 is incorporated by reference.

FIELD

This specification relates to treatment of selenium-containing wastewater.

BACKGROUND

The following paragraphs are not an admission that any of the information below is common general knowledge or citable as prior art.

Selenium is an essential trace element, but becomes toxic at very low concentrations. Selenium accumulates in the bodies of plants and fish that live in selenium-contaminated water and in the bodies of wildlife and people that eat those plants and fish. In people, elevated selenium concentrations may cause neurological damage and hair and nail loss.

Selenium has been treated in biological reactors, for example as described in U.S. Pat. No. 6,183,644 and International Publication Number WO 2007/012181, and as used in ABMet™ reactors sold by the GE Water and Process Technologies. In such reactors, dissolved selenium is removed from contaminated water by treating the water in a reactor containing selected endemic and other selenium reducing organisms. Microbes may be isolated from the specific water or imported from other selenium contaminated water. The microbes are then screened for ability to reduce selenium under the site specific environmental conditions. The selected microbes are optimized for selenium reduction, then established in a high density biofilm within a reactor. The selenium contaminated water is passed through the reactor with optimized nutrient mix added as needed. The elemental selenium is precipitated and removed from the water. The entirety of U.S. Pat. No. 6,183,644 is incorporated herein by this reference to it.

Further, U.S. Publication No. 2010/0300963 provides for an apparatus or process for treating flue gas desulfurization blow down water or other wastewaters having selenium or nitrate or both, or a process or apparatus for biologically removing inorganic contaminants, for example nitrogen, selenium, arsenic, mercury or sulphur, from wastewater. The entirety of U.S. Publication No. 2010/0300963 is incorporated herein by this reference to it.

A prior art biological reactor, such as ABMet, is schematically illustrated in FIG. 1. A reactor 100 comprises a media bed 101 supporting a population of selenium-reducing microorganisms. Activated carbon may be employed as the medium and is typically provided in the form of granular activated carbon (GAC). Wastewater enters the reactor 100 through upper port 106, flows downward through the media bed 101 and exits through the lower port 102. As solids accumulate within the media bed 101, the pressure drop across the media bed 101 will increase. At a selected time interval or pressure point, the media bed may be flushed. This operation may be accomplished by utilizing backwash port 103 and its associated distribution and collection system 105. The upflow velocity applied during flushing results in an upward expansion of the media bed into a bed expansion layer. The backwash water and flushed entrained solids may be removed through trough 108. The reactor 100 provides an expansion space above the media bed 101 to accommodate media expansion. A headspace layer is provided above the expansion layer and below reactor cover 109 to accommodate gases released by microorganisms.

SUMMARY

The following summary is intended to introduce the reader to this specification but not define any invention. Inventions may reside in the combination of one or more of the apparatus elements or process steps described anywhere in this document.

In a reactor as shown in FIG. 1, if the wastewater influent contains nitrates, denitrification of the wastewater influent takes place before selenium removal in the media bed. Denitrifying biomass accumulates in the media bed and produces nitrogen gas. The nitrogen gas produced as a result of denitrification may not be readily released from the media bed due to its compact nature and relatively small size of the medium. As a result, the denitrifying bacteria and the produced nitrogen gas may create flow path blockage, which necessitates frequent backwashing. This problem is exacerbated for influent containing high concentration of nitrates (i.e. over 50 ppm).

An apparatus and process are described herein that may be used to reduce the total selenium content of wastewater, optionally including wastewater with high nitrate concentration.

This specification describes a biological reactor with two or more types of media, useful for treating wastewater that contains selenium. An upstream medium is relatively porous and suitable for denitrification. A downstream medium is suitable for reducing selenium. The upstream medium preferably also allows at least some expansion of the downstream medium into it.

When in use, a denitrification zone forms upstream a selenium reduction zone. The upstream medium supports a population of nitrogen reducing microorganisms. As wastewater passes through the denitrification zone, the nitrate concentration is reduced and the resulting nitrogen gas travels up through the relatively porous media to the top of the biological reactor. The wastewater then enters the selenium reduction zone, in which the downstream medium supports a population of selenium reducing microorganisms. The selenium concentration is reduced and the resulting elemental selenium is removed from the media bed by backwashing. There may also be other reactions. For example, oxygen reduction may take place within the denitrification zone and sulfate reduction may take place within the selenium reduction zone.

The reactor and process are able to treat wastewater with a high nitrogen concentration. In particular, at least some of the influent nitrogen is reduced in the relatively porous upstream bed. The resulting nitrogen gas rises through the upstream media. In contrast, when existing reactors are used to treat wastewater with a high nitrogen concentration, nitrogen gas bubbles tend to collect in the bed. This resists forward wastewater flow, or requires frequent backwashing. After passing through the denitrification zone, the wastewater contains less nitrogen when it enters the relatively less porous medium of the selenium reduction zone. Less nitrogen gas is produced in the selenium reduction zone.

Optionally, the upstream medium may be sufficiently open or porous to admit some of the downstream medium when the reactor is backwashed. The upstream medium can then extend upwards to the influent piping gird or the overflow troughs. Optionally, an existing reactor with a selenium reducing medium may be retrofit by adding a relatively porous medium in some or all of a bed expansion area of the reactor. Adding the upstream medium may increase the treatment capacity of the retrofitted reactor or, in a new reactor, may increase the treatment capacity per unit volume of the biological reactor when compared to a reactor with an empty expansion layer above a single medium. In conventional systems, this expansion layer is provided for periodic expansion of the media bed during backwash. The system and process herein convert soluble nitrogen into gas in an upstream medium from which the nitrogen gas is more freely released, which at least reduces the need to backwash and fluidize or expand the downstream selenium reducing medium to release nitrogen bubbles. When the downstream medium is backwashed to release elemental selenium, at least some of the expansion of the selenium reducing medium extend into the upstream medium.

DETAILED DESCRIPTION

Figure 1:
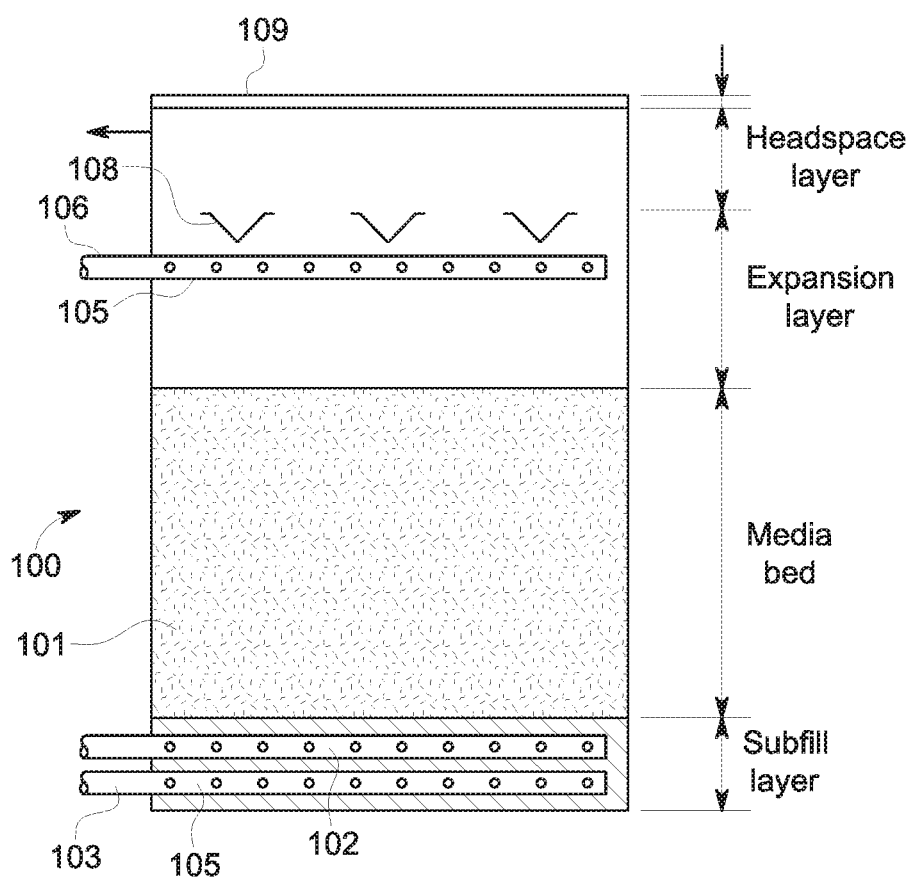
FIG. 1 is a schematic representation of a prior art biological reactor.
Figure 2:
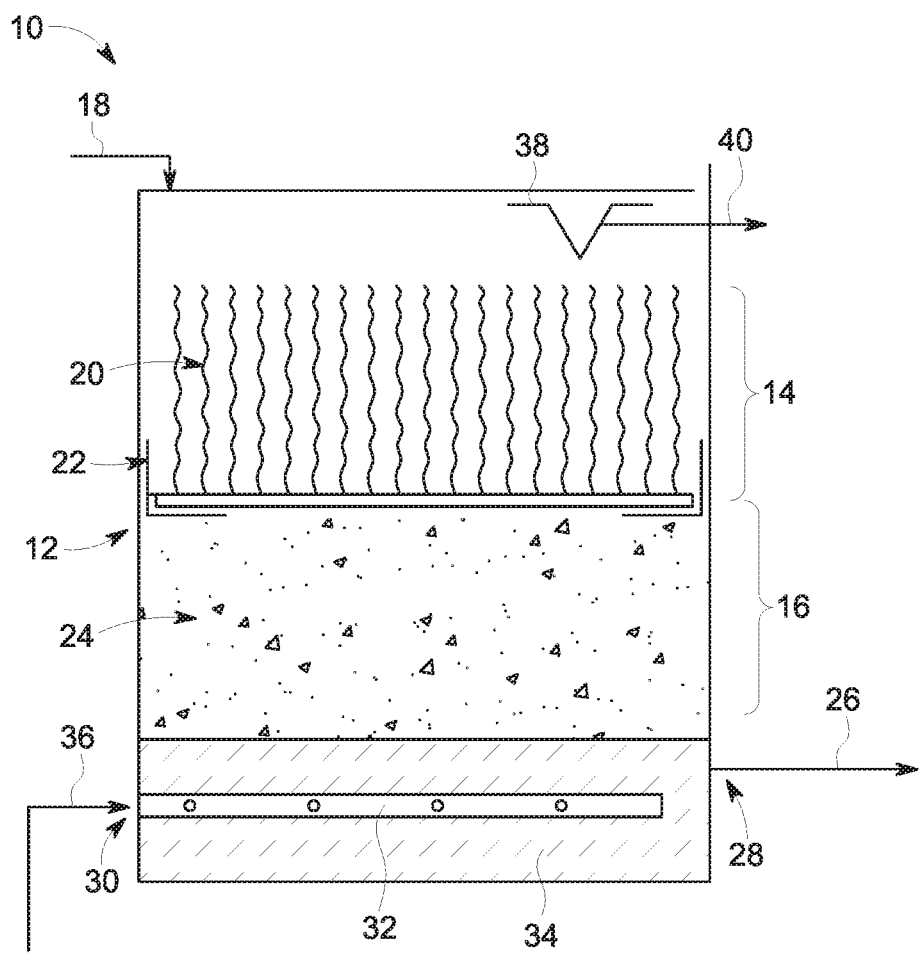
FIG. 2 is a schematic representation of a biological reactor embodying the features of the present invention.

FIG. 2 shows a treatment system 10 which includes a biological reactor 12. The system 10 may be used to remove selenium from wastewater. Biological reactor 12 contains a denitrification zone 14 and a selenium reduction zone 16. Biological reactor 12, as shown, is organized as a downwards plug flow reactor. Other types of reactors and reactor configurations may be used.

During normal operation, wastewater influent 18 enters the biological reactor 12 and travels downward by gravity through the denitrification zone 14. The denitrification zone 14 supports a population of nitrogen reducing organisms. The organisms may be located in a fixed biofilm on relatively porous media bed 20. Media used in the porous media bed 20 provides adequate surface area for microbial growth and is sufficiently porous to allow liquid flow within the biological reactor 12 without significant pressure loss even as nitrogen gas is produced. The porous media bed 20 may comprise stationary media such as vertically configured trickling filter media, stationary submerged media, activated carbon cloth, rope structures or synthetic fiber structures on which biofilm can grow. Loose media, for example MBBR media or synthetic media, may also be used. The porous media bed 20 may be supported by brackets 22 or a plate attached to the biological reactor 12. Alternatively, the porous media bed may rest on the selenium reduction zone 16.

As wastewater influent 18 flows through the denitrification zone 14, the nitrogen reducing organisms convert at least a portion of soluble nitrogen contained in the wastewater influent 18 to nitrogen gas. The nitrogen gas travels upwards through the porous media bed 20 where it may be collected. Alternatively, the biological reactor 12 may be open to atmosphere.

Optionally, the porous media bed 20 may also contain selenium reducing microorganisms to facilitate at least partial reduction of selenium contained in wastewater influent 18.

As wastewater influent 18 leaves the denitrification zone 14, it travels by gravity to the selenium reduction zone 16. The selenium reduction zone 16 supports a population of selenium reducing organisms. The organisms may be located in a fixed biofilm on compacted media bed 24. Activated carbon may be employed as the medium and provides a large surface area available for microbial growth. The activated carbon may be in the form of GAO or pelletized activated carbon. Other media might be used, for example polymeric fibers, crushed stone, pumice, sand, plastic media or gravel.

While passing through the compacted media bed 24, selenium and remaining nitrates, if any, are biologically removed from wastewater influent 14 and are retained within the compacted media bed 24.

Treated effluent 26 exits the biological reactor 12 through effluent port 28. In the preferred embodiment, the effluent port 28 is located below the compacted media bed 24.

During normal operation, solids accumulate in the compacted media bed 24 and the pressure drop across the compacted media bed 24 will increase deteriorating filter efficiency. Backwashing may be initiated at a selected time interval or pressure drop set point.

During backwashing, backwash liquid 36 enters the biological reactor 12 through backwash port 30, which may be connected to a distribution system 32, for example one or more perforated horizontal pipes. Aggregate 34 may be installed around the distribution systems 32 below the compacted media bed 24 to aid in flow distribution while also preventing breakthrough of media to the distribution systems 32. Other systems and arrangements suitable for distributing the backwashing fluid through the compacted media bed 24 may also be used.

Backwash liquid 36 travels upwards through the compacted media bed 24. The solids attached to the compacted media bed 24 are removed and entrained in the backwash liquid 36. The backwash liquid 36 and dislodged solids travel upwards through the media bed 20, and are removed through troughs 38 connected to a backwash effluent line 40. In addition to solids, gasses such as carbon dioxide, nitrogen, and hydrogen sulfide, are also released from the media bed 24 as the backwash liquid 36 travels upwards. Most of the gas separates from the backwash liquid 36 and exit though a vent to atmosphere or a treatment device attached to the biological reactor 12.

Figure 3:
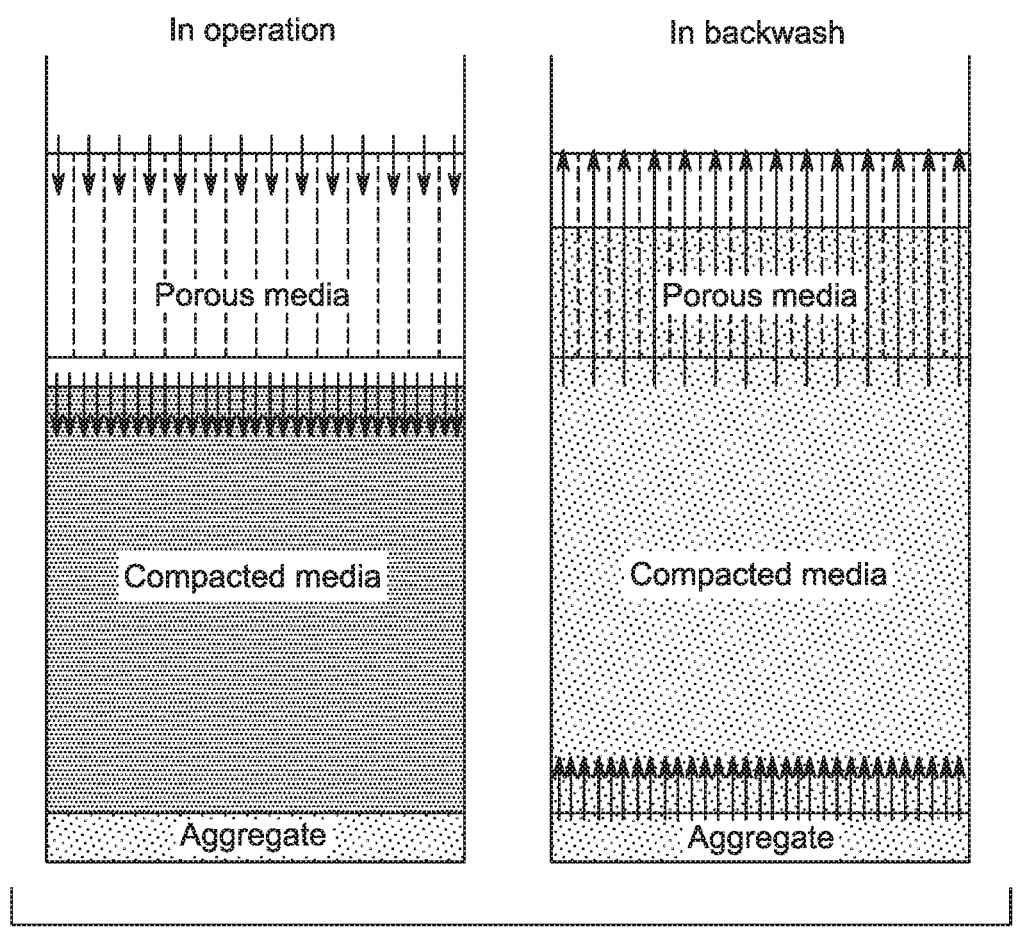
FIG. 3 is a schematic representation of the compacted media bed expansion during backwash.

The turbulence created by the passage of backwash liquid 36 may expand the compacted media bed 24 beyond its volume during normal operations. Preferably, the media bed 20 is adequately porous to allow the upwards expansion of the compacted media 24 during the backwashing cycle. A graphical representation of the compacted media bed expansion during backwash is provided in FIG. 3.

While the above description provides examples of one or more processes or apparatuses, it will be appreciated that other processes or apparatuses may be within the scope of the accompanying claims.

We claim:

1. A reactor for treating selenium-containing water, comprising:
    an upstream medium in an upstream media bed and a downstream medium in a downstream media bed wherein the upstream media bed is more porous than the downstream media bed, the reactor has a bed expansion area above the downstream media bed, the upstream medium is fixed in position relative to the reactor and located in some or all of the bed expansion area, the downstream medium comprises particles, and the upstream media is sufficiently porous to admit the particles of the downstream medium into the bed expansion area.

2. The reactor of claim 1 comprising organisms capable of reducing nitrogen attached to the upstream medium and organisms capable of reducing selenium attached to the downstream medium.

3. The reactor of claim 1 further comprising a pipe in or downstream of the downstream medium connected to a supply of backwashing fluid.

4. The reactor of claim 1 wherein the upstream media bed is supported by brackets or a plate attached to the reactor.

5. The reactor of claim 1 wherein the upstream medium comprises a medium selected from the group of vertically configured trickling filter media, activated carbon cloth, rope structures, or synthetic fiber structures.

6. The reactor of claim 1 wherein the upstream medium comprises MBBR media.

7. A process for treating water containing selenium comprising the steps of reducing nitrogen in an upstream medium and reducing selenium in a downstream medium wherein in an operation mode water flows downwards through the reactor, the upstream medium is located in an upstream media bed, the downstream medium is located in a downstream media bed below the upstream media bed, and the upstream media bed has a fixed position in the reactor and in a backwash mode water flows upwards through the reactor, the upstream media bed remains in the fixed position and the downstream media bed expands into at least part of the upstream media bed.

* * * * *